United States Patent
Voigt

(10) Patent No.: US 11,420,378 B2
(45) Date of Patent: Aug. 23, 2022

(54) CORE ROD ASSEMBLY FOR BLOW MOLDING AND HAVING MULTIPLE TEMPERATURE ZONES

(71) Applicant: Nalge Nunc International Corporation, Rochester, NY (US)

(72) Inventor: David F. Voigt, Fairport, NY (US)

(73) Assignee: Nalge Nunc International Corporation, Rochester, NY (US)

( * ) Notice: Subject to any disclaimer, the term of this patent is extended or adjusted under 35 U.S.C. 154(b) by 0 days.

(21) Appl. No.: 17/296,618

(22) PCT Filed: Dec. 6, 2019

(86) PCT No.: PCT/US2019/064904
§ 371 (c)(1),
(2) Date: May 25, 2021

(87) PCT Pub. No.: WO2020/118166
PCT Pub. Date: Jun. 11, 2020

(65) Prior Publication Data
US 2022/0001591 A1     Jan. 6, 2022

Related U.S. Application Data

(60) Provisional application No. 62/776,715, filed on Dec. 7, 2018.

(51) Int. Cl.
*B29C 49/64*     (2006.01)
*B29C 49/58*     (2006.01)
(Continued)

(52) U.S. Cl.
CPC ......... *B29C 49/6454* (2013.01); *B29C 33/76* (2013.01); *B29C 49/06* (2013.01)

(58) Field of Classification Search
CPC ..... B29C 49/06; B29C 33/76; B29C 49/6454; B29C 49/58; B29C 2049/5803
See application file for complete search history.

(56) References Cited

U.S. PATENT DOCUMENTS 3,233,416 A   2/1966   Rainwater et al.
3,450,805 A   6/1969   Chesser
(Continued)

FOREIGN PATENT DOCUMENTS

DE   102006007639 A1   8/2007
EP       1825988 B1    9/2011
EP       2714356 B1    1/2016

OTHER PUBLICATIONS

European Patent Office, Supplementary European Search Report, Application No. 19893555.3, dated Nov. 22, 2021 (7 pages).
(Continued)

*Primary Examiner* — Robert B Davis
(74) *Attorney, Agent, or Firm* — Wood Herron & Evans LLP

(57) ABSTRACT

A core rod assembly (10) for blow molding includes a core rod head (16), a first fluid pathway (A1) extending along a first length of the core rod head (16), and a second fluid pathway (A2) extending along a second length of the core rod head (16). The first and second fluid pathways (A1, A2) may be fluidly isolated from each other and provide selective temperature control of respective first and second portions of the core rod assembly (10) during the blow molding process. At least a portion of the first fluid pathway (A1) may be longitudinally offset from the second fluid pathway (A2) so as to define respective first and second temperature zones (zone 1, zone 2) along the respective first and second portions of the core rod assembly (10).

35 Claims, 12 Drawing Sheets

(51) Int. Cl.
  *B29C 33/76* (2006.01)
  *B29C 49/06* (2006.01)

(56) References Cited

U.S. PATENT DOCUMENTS

| | | | |
|---|---|---|---|
| 3,470,282 A | 9/1969 | Scalora | |
| 3,690,802 A * | 9/1972 | Fischer | B29C 49/063 |
| | | | 425/534 |
| 3,707,591 A | 12/1972 | Chalfant | |
| 3,740,180 A * | 6/1973 | Sidur | B29C 45/7312 |
| | | | 425/451 |
| 3,905,738 A | 9/1975 | Farrell | |
| 3,910,743 A | 10/1975 | Farrell | |
| 3,910,746 A | 10/1975 | Mrusek et al. | |
| 3,955,908 A | 5/1976 | Farrell | |
| 4,043,735 A | 8/1977 | Farrell | |
| 4,238,105 A | 12/1980 | West | |
| 4,285,657 A | 8/1981 | Ryder | |
| 4,473,515 A | 9/1984 | Ryder | |
| 5,085,822 A | 2/1992 | Uehara et al. | |
| 6,168,740 B1 | 1/2001 | Koch et al. | |
| 2017/0291345 A1 | 10/2017 | Toyoda et al. | |

OTHER PUBLICATIONS

The International Bureau of WIPO, International Preliminary Report on Patentability, International Application No. PCT/US2019/064904, dated Jun. 8, 2021 (8 pages).

International Searching Authority/US, International Search Report and Written Opinion of the International Searching Authority, International Application No. PCT/US2019/064904, dated Apr. 6, 2020 (12 pages).

* cited by examiner

CORE ROD ASSEMBLY FOR BLOW MOLDING AND HAVING MULTIPLE TEMPERATURE ZONES

CROSS REFERENCE TO RELATED APPLICATIONS

The present application is a U.S. National Stage entry under 35 U.S.C. 371 of, and claims priority to, International Application No. PCT/US2019/064904, filed Dec. 6, 2019, which claims the filing benefit of U.S. Provisional Application Ser. No. 62/776,715, filed Dec. 7, 2018, the disclosures of which are incorporated herein by reference in their entireties.

FIELD OF THE INVENTION

The present invention relates generally to blow molding and, more particularly, to a core rod assembly for use in blow molding applications.

BACKGROUND OF THE INVENTION

Blow molding, such as injection blow molding (IBM), is a well-known technique that is used for manufacturing plastic articles such as bottles and other containers. The IBM process can be divided into three main steps: injection, blowing, and cooling/ejection. During the injection step, a molten polymeric material such as a resin (e.g., PETG) is injection molded onto a core rod in a hollow injection mold cavity to form a preform. The injection mold cavity forms the external shape of the preform and the core rod forms the internal shape of the preform. Typically, the preform includes a fully formed neck and a thick tube of material attached to the neck that will ultimately form the body of the finished article. After the injection step, the core rod carrying the preform is transferred (e.g., rotated) to a blow molding station. The blow molding station may include, for example, a hollow blow mold cavity that receives the core rod and accompanying preform. During the blowing step, a portion of the core rod (e.g., a distal tip) opens to allow compressed air to inflate the body of the preform. The body is inflated into contact with the inner surface of the blow mold cavity to achieve the external shape of the finished article and is allowed to cure, such as by cooling. The core rod carrying the finished article is transferred (e.g., rotated) to an ejection position, where the finished article is stripped off the core rod.

During the IBM process, the core rod may be uniformly heated to an elevated temperature to prevent the preform from prematurely curing prior to the blowing step. For example, it may be desirable to heat the core rod to a temperature greater than the glass transition temperature of the preform material (e.g., resin) and/or greater than the temperature at which the "sticky phase" of the preform material begins, which may be about 10° C. less than the glass transition temperature. Thus, for PETG whose glass transition temperature is about 78° C. or about 172° F. to about 80° C. or about 176° F., such that the sticky phase starts at about 70° C. or about 158° F., the core rod may be heated to about 78° C. or about 172° F. Heating the core rod to a temperature substantially lower than this may result in improper blowing which may lead to various defects, such as folds, uneven wall thicknesses, or other nonuniformities in the finished articles.

Therefore, in some cases, a single heated fluid distribution system may be provided within the core rod along a length thereof for evenly heating the preform carried by the core rod to the target temperature to prevent the preform from prematurely curing.

An undesirable consequence of such core rod heating is the effect of the heating on the neck portion. In particular, heating the neck portion to the same temperature as the body portion may cause the thicker section of the neck portion to be sticky or tacky during the ejection step. As a result, the neck portion may tend to stick to the core rod during ejection. During bulk or mass production IBM processes, sticky residue from each neck portion may gradually build up on the core rod. This residue may cause subsequent neck portions to stick to the core rod during ejection, resulting in damage to the article, blow mold machine, and/or tooling and thereby requiring production downtime.

To address the tendency of the neck portion to stick to the core rod, manufacturers often implement routine wipe-downs of the core rods to remove sticky residue and/or to apply mold lubricant. For example, such wipe-downs may be scheduled to occur at one-hour intervals during production. The scheduled wipe-downs must be performed in a timely manner to ensure that the neck portions do not begin to stick to the core rod. However, the wipe-downs themselves may cause quality issues, such as bubbles or visual defects in the finished article, and inevitably cause production delays.

Therefore, a need exists to provide a core rod for blow molding which addresses these and other problems associated with conventional blow molding (including injection blow molding) systems.

SUMMARY OF THE INVENTION

The present invention overcomes the foregoing and other shortcomings and drawbacks of core rod assemblies for blow molding (including injection blow molding) heretofore known. While the invention will be described in connection with certain embodiments, it will be understood that the invention is not limited to these embodiments. On the contrary, the invention includes all alternatives, modifications and equivalents as may be included within the spirit and scope of the present invention.

According to one embodiment, a core rod assembly for blow molding, such as injection blow molding (IBM) by way of example, is provided having a core rod head, a first fluid pathway extending along a first length of the core rod head, and a second fluid pathway extending along a second length of the core rod head. The first and second fluid pathways are fluidly isolated from each other, with a portion of the first fluid pathway being longitudinally offset from the second fluid pathway. The first and second fluid pathways may each form part of respective first and second fluid distribution systems for providing selective temperature control of respective first and second portions of the core rod assembly.

For example, the core rod assembly may be configured to form an internal shape of a preform that is positioned over the core rod assembly in an injection molding phase of the injection blow molding process. The preform formed on the core rod assembly includes a neck portion and a body portion in one embodiment. The core rod assembly, with the preform positioned thereover, may then be advanced to a blow molding phase of the injection molding process wherein the preform is expanded by air or other fluid into a finished article, such as a bottle or other container.

In one embodiment, the first fluid pathway is positioned along, and in thermal communication with, an inner surface of the core rod head. In this embodiment, the second fluid pathway is positioned along an outer surface of the core rod head.

A core rod bubbler may be positioned at least partially within the core rod head, with the first fluid pathway being at least partially defined by the core rod bubbler and the core rod head. The core rod bubbler may include a valve stem positioned at least partially within the core rod bubbler, with a valve supported at one end of the valve stem.

In one embodiment, the core rod assembly includes a core rod body, with the core rod head being at least partially received within the core rod body such that the second fluid pathway is at least partially defined by the core rod body and the core rod head with the second fluid pathway being in thermal communication with a portion of the core rod body.

According to one embodiment of the present invention, the first fluid pathway defines a first zone along a first length of the core rod assembly, and the second fluid pathway defines a second zone along a second length of the core rod assembly. The first zone is longitudinally offset from the second zone with the first zone being located distally of the second zone.

In one embodiment, the first fluid pathway includes at least one first helical leg, with the first zone being defined by the at least one first helical leg. The second fluid pathway may include at least one second helical leg, with the second zone being defined by the second helical leg.

According to one embodiment, a method of blow molding an article, such as a bottle or other container, includes the step of forming the preform over first and second portions of the core rod assembly. The preform may include a body portion positioned over the first portion of the core rod assembly and a neck portion positioned over the second portion of the core rod assembly.

A first temperature of the body portion of the preform is controlled via a first temperature-controlled fluid in thermal communication with the first portion of the core rod assembly, and a second temperature of the neck portion of the preform is controlled via a second temperature-controlled fluid in thermal communication with the second portion of the core rod assembly. The second temperature-controlled fluid is fluidly isolated from the first temperature-controlled fluid, and the first temperature may be greater than the second temperature.

The use of the first and second temperature-controlled fluids may allow the temperatures of the neck and body portions of the preform to be selectively controlled independent of each other. This may allow the neck portion to be maintained at a lower temperature than that of the body portion which may reduce or eliminate the tenancies of the neck portion to stick to the core rod assembly and/or to leave residue on the core rod assembly during ejection of the finished article from the core rod assembly. As a result, routine wipe-downs of the core rod assembly or defects in the neck of the bottle or other container may be reduced or eliminated.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
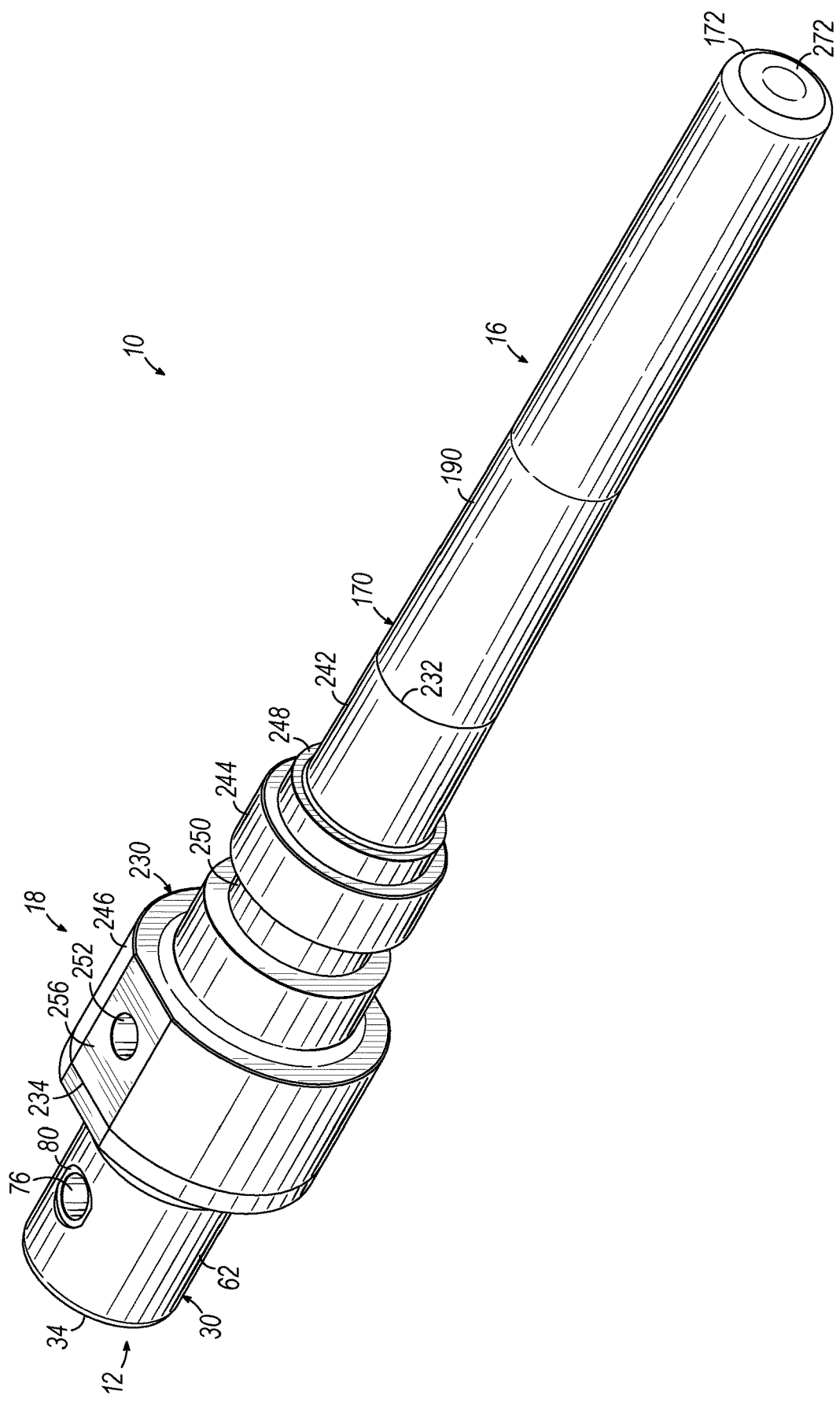
FIG. 1 is a perspective view of a core rod assembly in accordance with one embodiment of the present invention.
Figure 2:
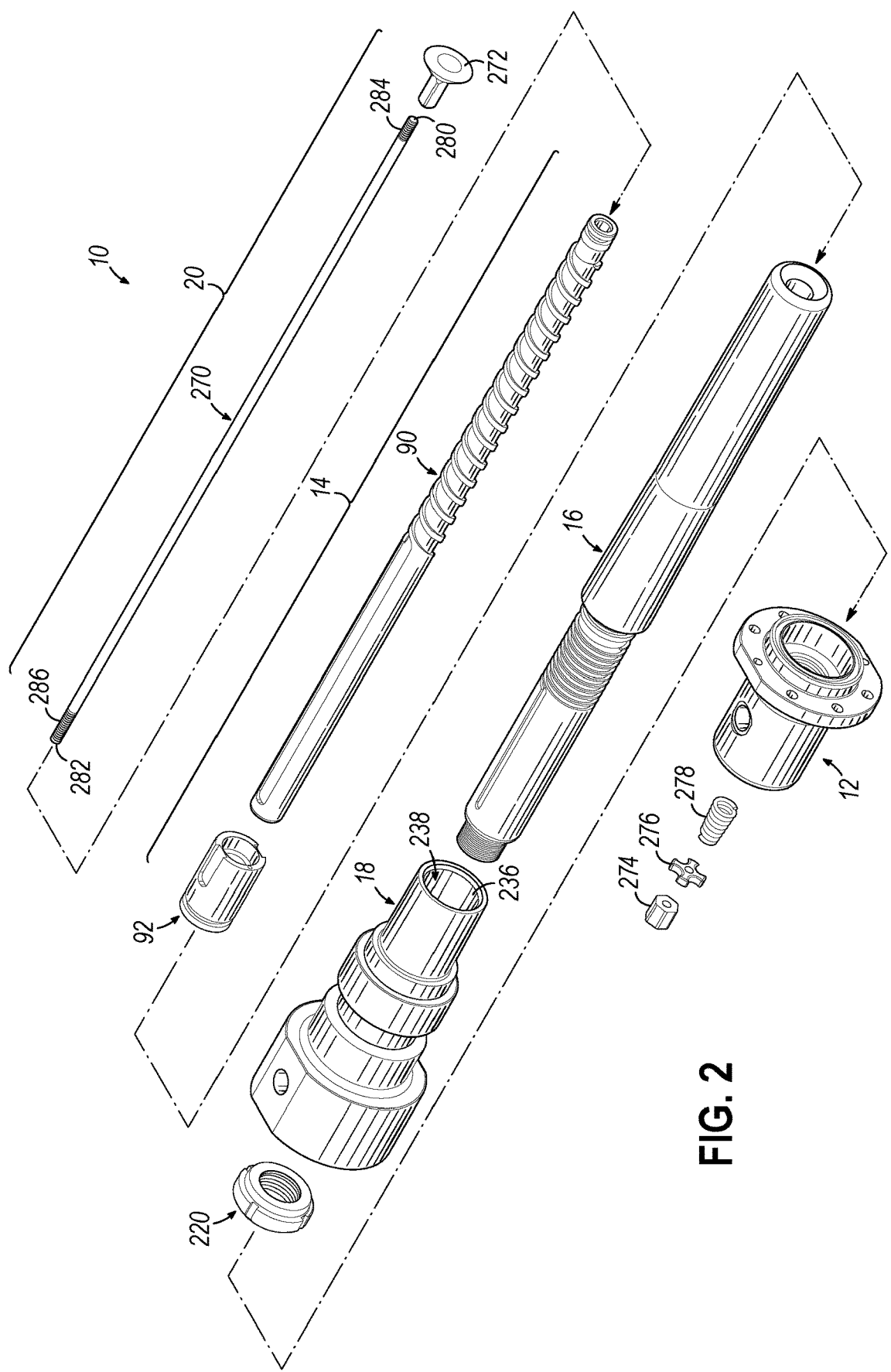
FIG. 2 is an exploded view of the core rod assembly of FIG. 1.

With reference to FIGS. 1 and 2, an exemplary core rod assembly 10 according to one embodiment of the present invention is illustrated for use in a blow mold application. The exemplary core rod assembly 10 includes a core rod base or end support 12, a core rod baffle or bubbler subassembly 14, a core rod head 16, a core rod body 18, and a core rod valve stem subassembly 20 coupled to each other in a coaxial arrangement as will be described in greater detail below. At least a portion of the core rod assembly 10 is configured to form the internal shape of a preform 22 (FIG. 5) positioned thereover, such as via an injection molding process, and to assist in blow molding the preform 22 into a finished article 24, such as a bottle or other container (FIG. 6). As described in greater detail below, the core rod assembly 10 includes first and second fluid distribution systems 26, 28 (FIG. 5) for providing selective temperature control of first and second portions of the preform 22 during the injection blow molding (IBM) process.

End Support

Figure 5:
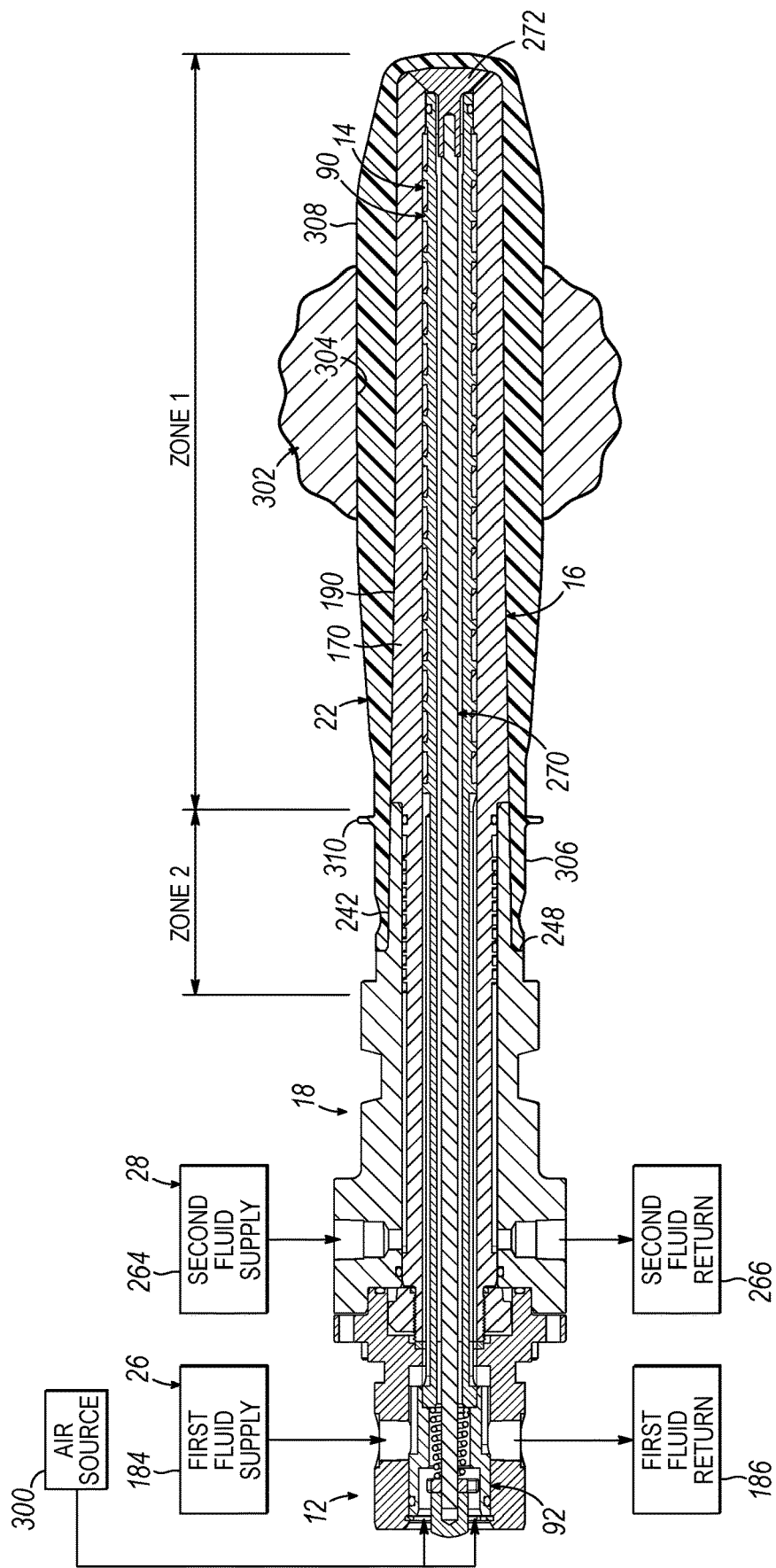
FIG. 5 is a cross sectional view of the core rod assembly of FIG. 1, showing the core rod assembly at least partially inserted into an injection mold and a preform formed between the core rod assembly and the injection mold.
Figure 5A:
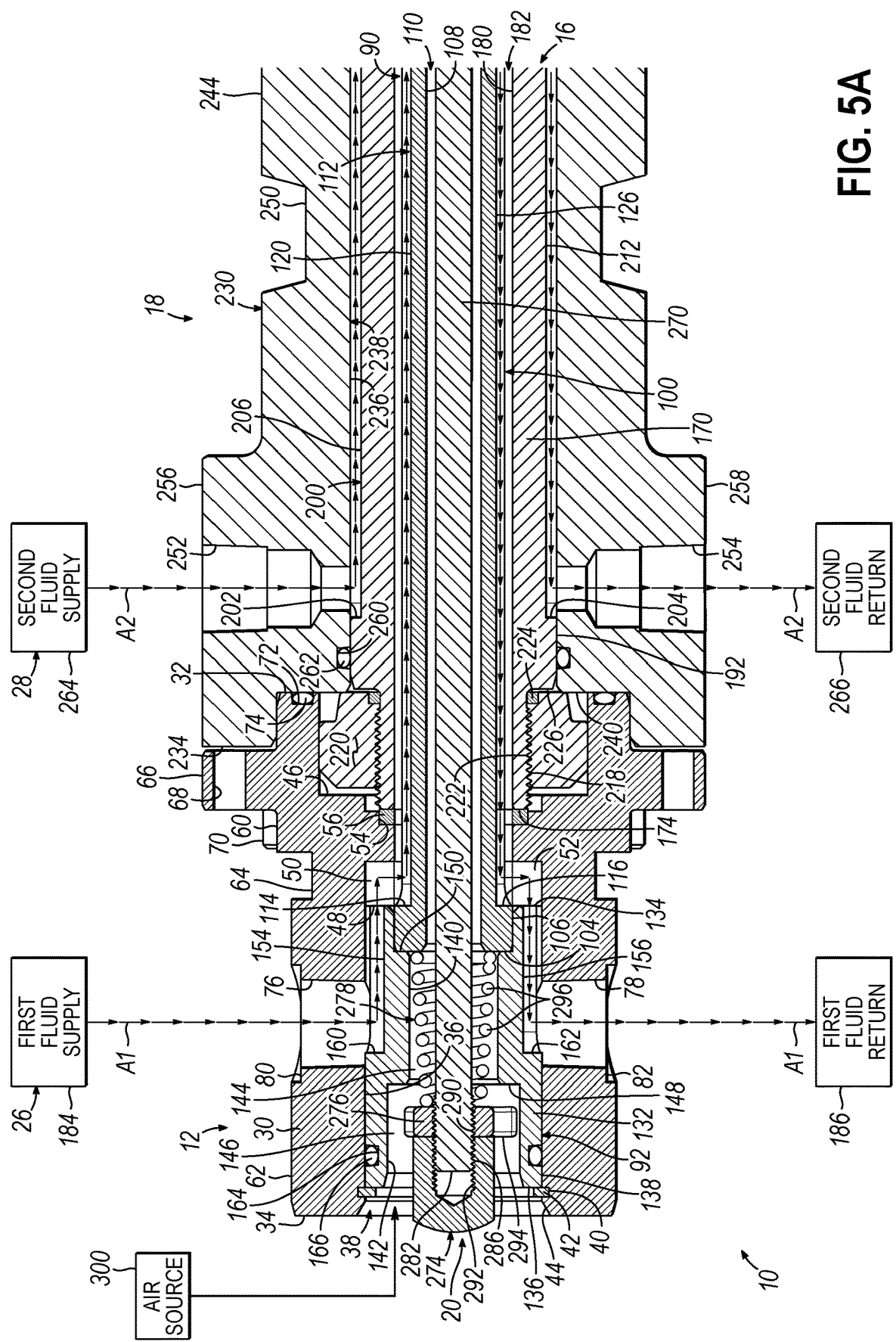
FIGS. 5A-5C are magnified cross sectional views similar to FIG. 5 and showing first and second fluid pathways through the core rod assembly.
Figure 6:
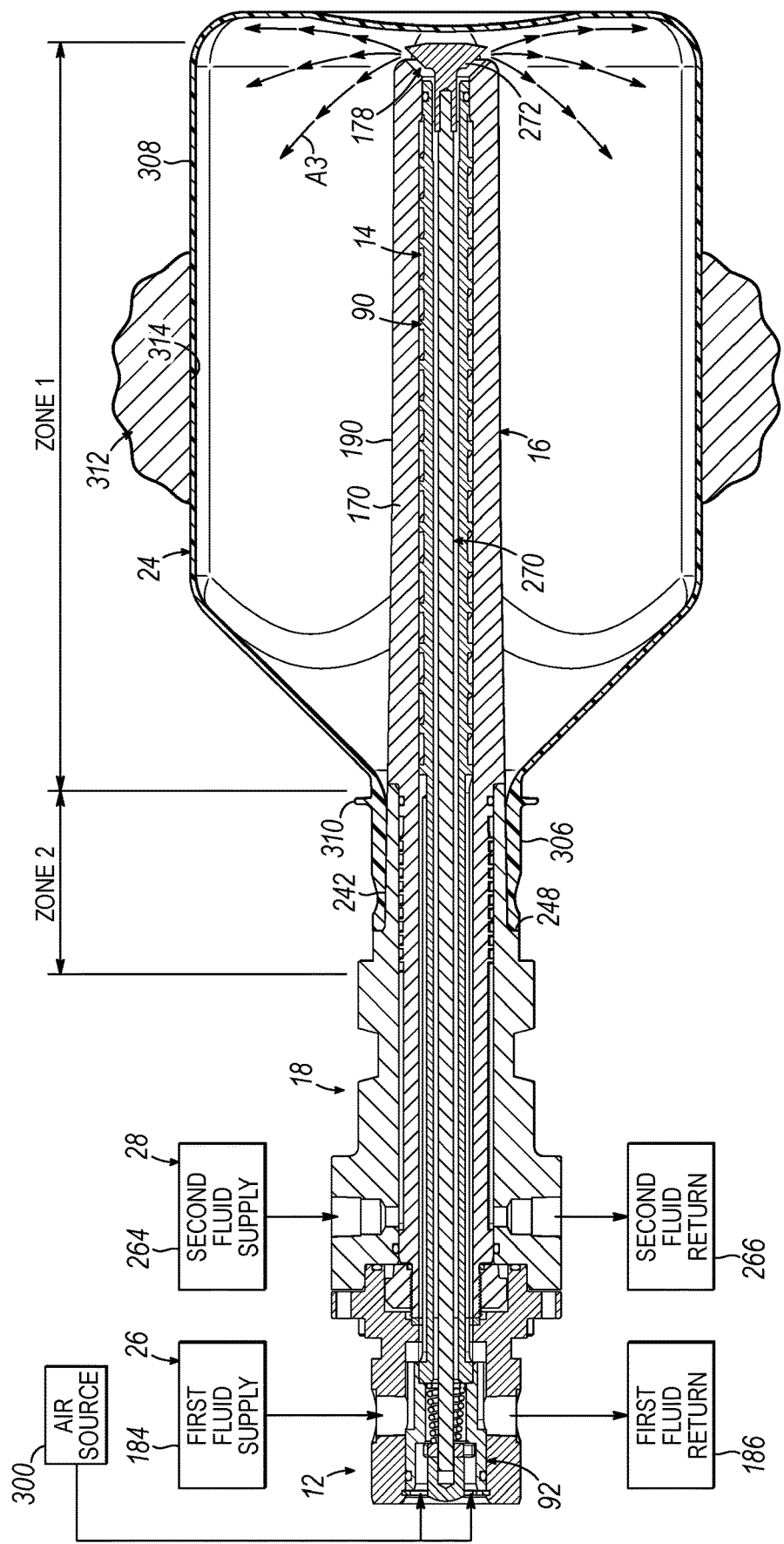
FIG. 6 is a cross sectional view similar to FIG. 5, showing the core rod assembly at least partially inserted into a blow mold and a finished article formed by inflating the preform into contact with the blow mold.

Referring now to FIGS. 5 and 5A, with continuing reference to FIGS. 1 and 2, the illustrated core rod end support 12 includes a generally cylindrical wall 30 extending between first and second ends 32, 34, and including a generally cylindrical inner surface 36 defining a generally cylindrical chamber 38 configured to receive at least portions of the bubbler and valve stem subassemblies 14, 20. An annular notch 40 is provided on the inner surface 36 of the wall 30 at or near the second end 34 for receiving a retaining ring 42 configured to operatively engage with at least a portion of the bubbler subassembly 14. As shown, an air inlet passageway 44 is provided in the second end 34 and is in fluid communication with the chamber 38 and/or components located within the chamber 38, as described in greater detail below. A recess 46 is positioned in the first end 32 of the end support 12 for receiving at least a portion of the core rod body 18, and is separated from the chamber 38 by an annular partition 48.

In the embodiment shown, first and second oppositely disposed radial slots 50, 52 extend partially longitudinally through the annular partition 48 and open to the chamber 38. A shoulder 54 configured to receive an O-ring 56 is provided in the annular partition 48 and opens to the recess 46.

The wall 30 of the end support 12 also includes a generally cylindrical first outer surface 60 proximate the first end 32 and a generally cylindrical second outer surface 62 proximate the second end 34. The first and second outer surfaces 60, 62 are spaced apart from each other by an annular notch 64 which may be used for mounting purposes, for example, as described in greater detail below.

In the embodiment shown, a radially outwardly extending mounting flange 66 is provided on the first outer surface 60 of the wall 30 at or near the first end 32. A plurality of bores 68 extend through the mounting flange 66 for receiving corresponding fasteners 70 to facilitate coupling of the end support 12 to the body 18, for example. A notch 72 is provided in the first end 32 for receiving an O-ring 74, for example.

As shown, a first fluid inlet passageway 76 and a first fluid outlet passageway 78 extend radially through the wall 30 on opposite sides thereof from the second outer surface 62 to the chamber 38, the purposes of which are described in greater detail below. First and second counter bores 80, 82 are provided in the second outer surface 62 at the fluid inlet and outlet passageways 76, 78 and may be configured to receive one or more fluid fittings (not shown), for example.

Bubbler Subassembly

Figure 3:
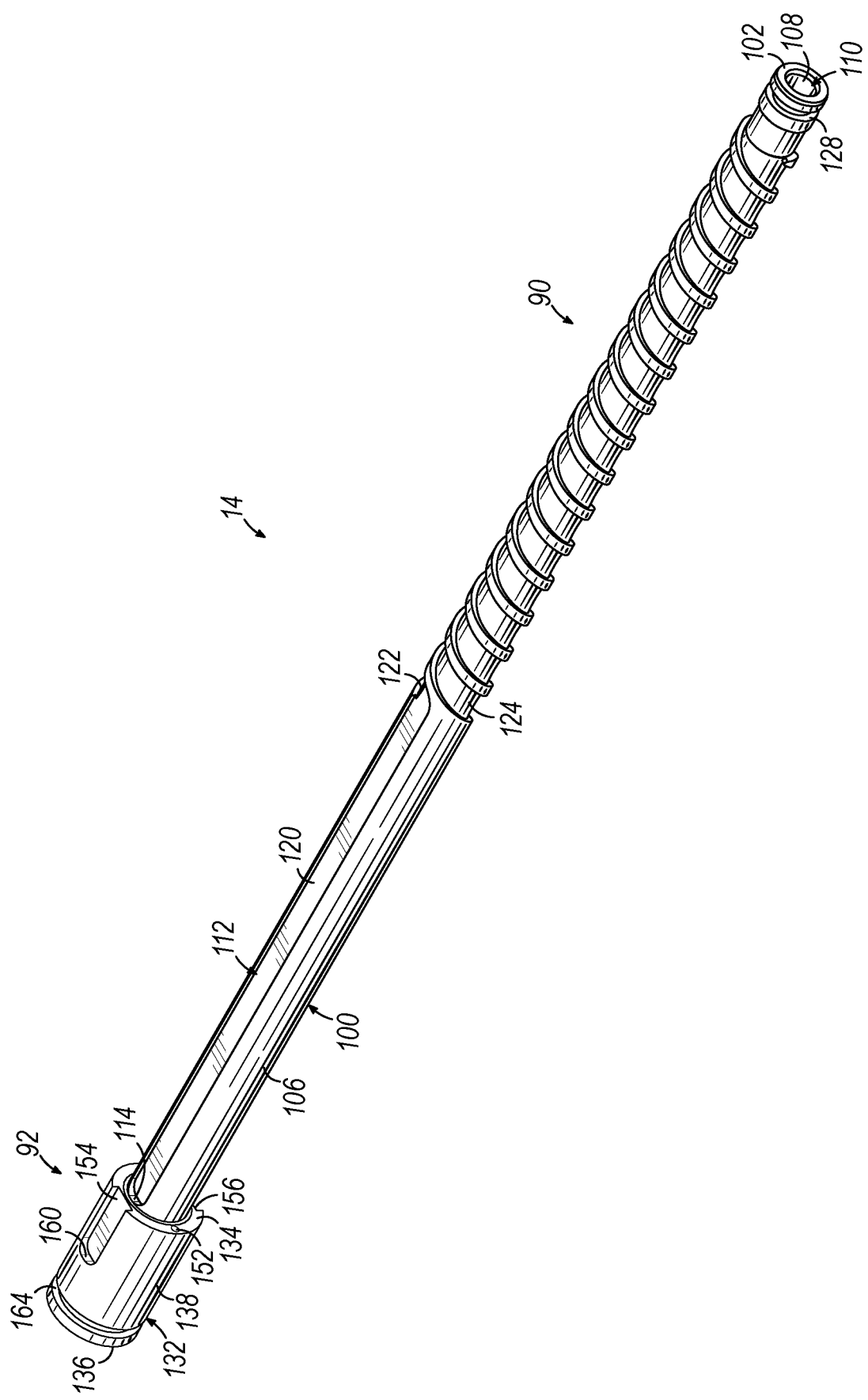
FIG. 3 is a perspective view of the core rod bubbler subassembly of FIG. 2.
Figure 5B:
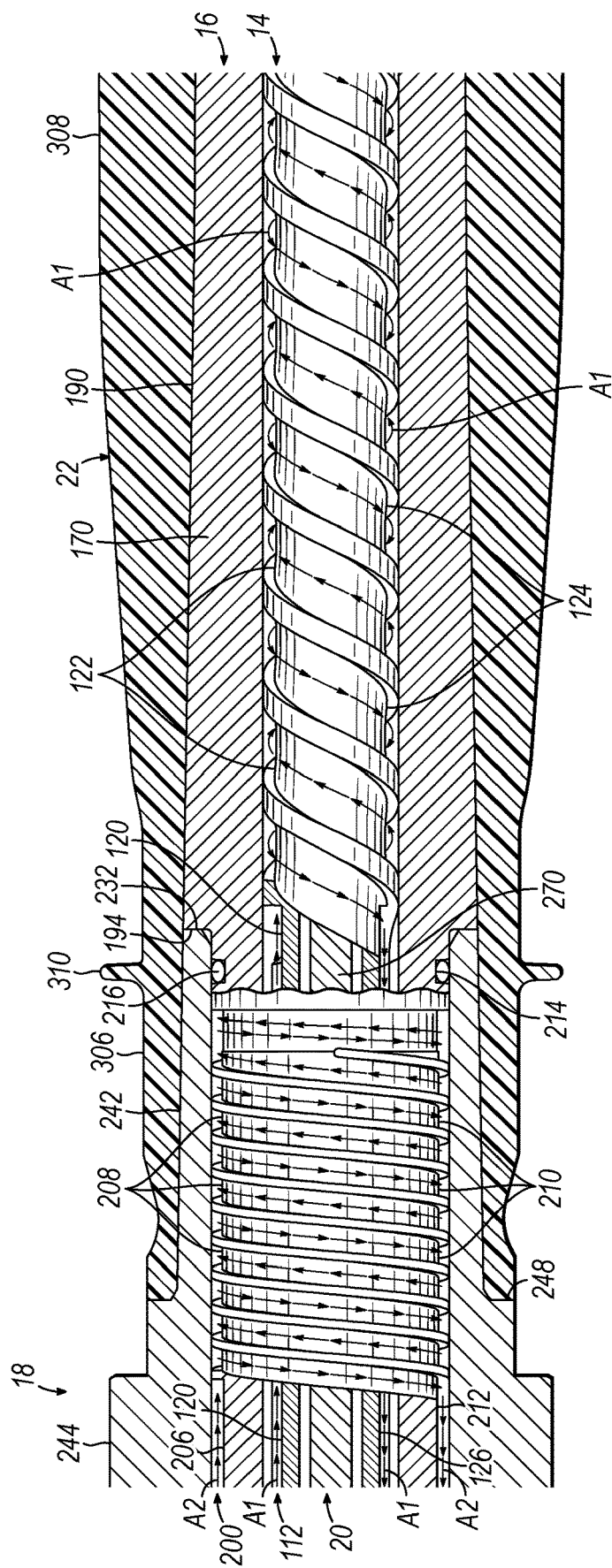
Figure 5C:
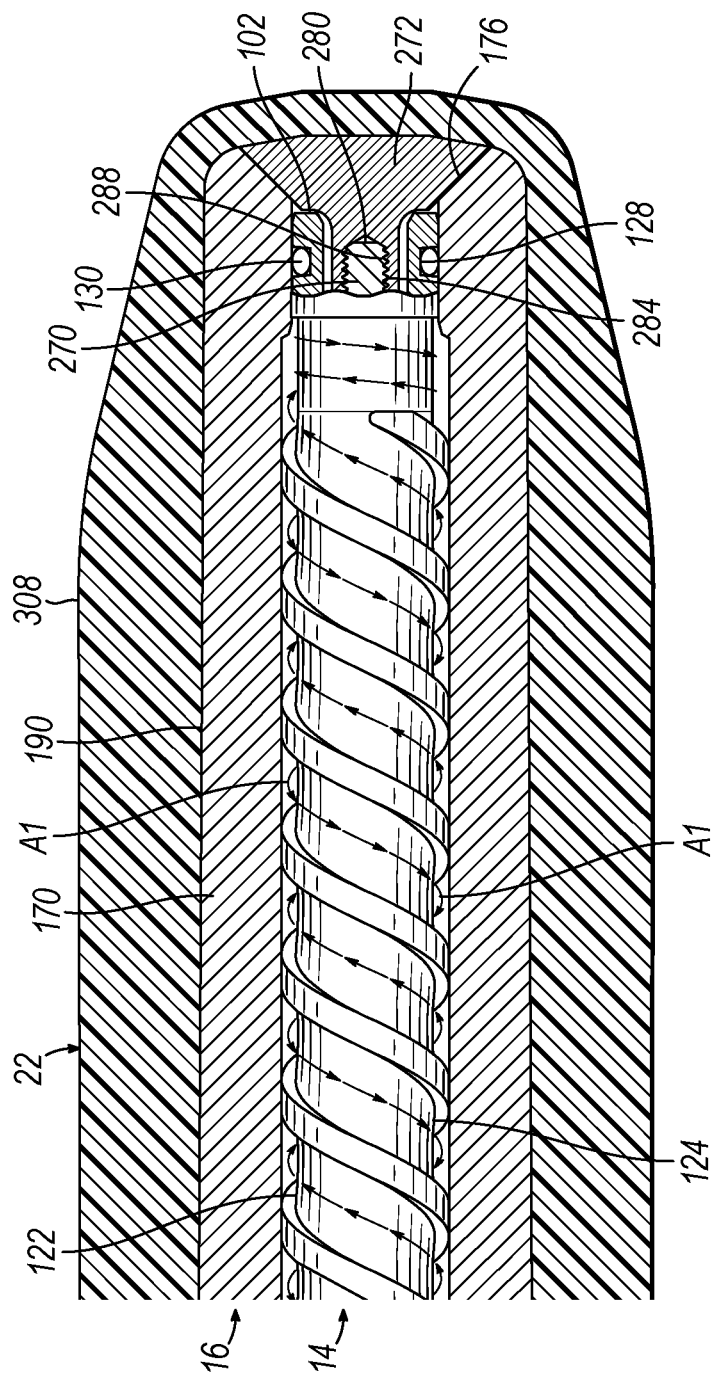

Referring now to FIGS. 3, 5B, and 5C, with continuing reference to FIGS. 1, 2, 5, and 5A, the illustrated core rod bubbler subassembly 14 includes a core rod baffle or bubbler 90 fixedly coupled to a core rod insert 92, such as via welding. The illustrated core rod bubbler 90 includes a generally cylindrical wall 100 extending between first and second ends 102, 104 and including a generally cylindrical outer surface 106 and a generally cylindrical inner surface 108 defining a generally cylindrical bore 110 configured to receive a portion of the core rod valve stem subassembly 20. The outer surface 106 of the bubbler 90 may be configured to form a fluid tight seal with the annular partition 48 of the end support 12 and/or with a portion of the core rod head 16, as described in greater detail below.

As shown, a groove 112 is provided on the outer surface 106 of the bubbler 90 for receiving a fluid, such as a temperature-controlled fluid, and extends between first and second oppositely disposed ends 114, 116 each proximate the second end 104 of the wall 100. The groove 112 includes a first longitudinally extending leg 120 proximate the second end 104 of the wall 100, first and second helical legs 122, 124 proximate the first end 102 of the wall 100, and a second longitudinally extending leg 126 proximate the second end 104 of the wall 100, the purposes of which are described in greater detail below. In the embodiment shown, the first and second longitudinally extending legs 120, 126 are positioned opposite each other on the outer surface 106. As shown, the wall 100 further includes an annular notch 128 in the outer surface 106 at or near the first end 102 for receiving an O-ring 130, for example.

The illustrated core rod insert 92 includes a generally cylindrical wall 132 extending between first and second ends 134, 136 and including a generally cylindrical outer surface 138 and first and second generally cylindrical inner surfaces 140, 142 defining first and second generally cylindrical chambers 144, 146, respectively, in fluid communication with each other. In the embodiment shown, the second inner surface 142 is positioned radially outwardly relative to the first inner surface 140 to define a shoulder 148 configured to operatively engage with a portion of the core rod valve stem subassembly 20, as described in greater detail below.

The first chamber 144 may be configured to fluidly communicate with the bore 110 of the core rod bubbler 90, and the second chamber 146 may be configured to fluidly communicate with the air inlet passageway 44 of the end support 12. As shown, a recess 150 is positioned in the first end 134 of the insert 92 for receiving at least a portion of the core rod bubbler 90, such as the second end 104 thereof. A bore 152 is also positioned in the first end 134 of the insert 92 radially outwardly relative to the recess 150 for receiving an anti-rotation pin (not shown), for example.

As shown, first and second grooves 154, 156 are provided on the outer surface 138 of the insert 92 for receiving a fluid, such as a temperature-controlled fluid, and longitudinally extend from first and second ends 160, 162, respectively, to the first end 134 of the wall 132. In the embodiment shown, the first and second grooves 154, 156 of the insert 92 are positioned opposite each other on the outer surface 138 and are configured to align with the first and second longitudinally extending legs 120, 126 of the groove 112 of the bubbler 90 at or near the first end 134 of the insert 92 and at or near the first and second ends 114, 116 of the groove 112 of the bubbler 90, respectively. The first and second grooves 154, 156 of the insert 92 are also configured to align with the first fluid inlet and outlet passageways 76, 78 of the core rod end support 12 at or near the first and second ends 160, 162 of the grooves 154, 156, respectively, and to align with the first and second slots 50, 52 in the annular partition 48 of the end support 12, respectively, at or near the first end 134 of the insert 92. In the embodiment shown, the outer surface 138 of the insert 92 includes an annular notch 164 proximate the second end 136 and configured to receive an O-ring 166, for example.

As described above, the insert 92 and the bubbler 90 may be fixedly coupled together, such as by welding or any other suitable means, to form the bubbler subassembly 14. In this regard, the second end 104 of the bubbler 90 may be received by the recess 150 in the first end 134 of the insert 92 and welded thereto. With the insert 92 and bubbler 90 coupled together to form the bubbler subassembly 14, the first groove 154 of the insert aligns with the first longitudinal leg 120 of the groove 112 of the bubbler 90 at or near the first end 114 of the groove 112 of the bubbler 90 and is in fluid communication therewith, and the second groove 156 of the insert 92 aligns with the second longitudinal leg 126 of the groove 112 of the bubbler 90 at or near the second end 116 of the groove 112 of the bubbler 90 and is in fluid communication therewith. The first chamber 144 of the insert 92 aligns with and is in fluid communication with the bore 110 of the bubbler 90 at or near the second end 104 of the bubbler 90 and/or the first end 134 of the insert 92. At least a portion of the second end 104 of the bubbler 90 extends radially inwardly relative to the first inner surface 140 of the insert 92 for operatively engaging with a portion of the core rod valve stem subassembly 20, as described in greater detail below.

While the bubbler 90 and insert 92 are shown and described as discrete, separately formed pieces joined together to form the bubbler assembly 14 in an exemplary embodiment, the bubbler 90 and insert 92 may alternatively be integrally formed together as a unitary piece.

As described above, the bubbler subassembly 14 may be at least partially received by the chamber 38 of the end support 12. In this regard, the first end 134 of the insert 92 may operatively engage the annular partition 48 and the retaining ring 42 may operatively engage the second end 136 of the insert 92 to sandwich the insert 92 between the retaining ring 42 and the annular partition 48 to thereby fix the insert 92, and thus the bubbler 90, against longitudinal movement relative to the end support 12. In the embodiment shown, the first end 134 of the insert 92 operatively engages with the annular partition 48 to provide a fluid tight seal therebetween, and the outer surface 138 of the insert 92 operatively engages with the inner surface 36 of the end support 12 to provide a fluid tight seal therebetween. For example, the outer surface 138 and inner surface 36 may be sized and shaped relative to each other to provide an interference fit therebetween. In the embodiment shown, the O-ring 166 may assist in providing the fluid tight seal between the outer and inner surfaces 138, 36. In one embodiment, an anti-rotation pin (not shown) may extend between the bubbler subassembly 14, such as the bore 152 of the insert 92, and another component of the core rod assembly 10, such as a corresponding bore (not shown) in the annular partition 48 of the end support 12, to fix the bubbler subassembly 14 against rotational movement relative to the end support 12, for example.

With the bubbler subassembly 14 partially received by the end support 12 as shown, the second chamber 146 of the insert 92 is aligned with and in fluid communication with the air inlet passageway 44 of the end support 12, such that any fluid directed toward the chamber 38 of the end support 12 via the air inlet passageway 44 may be directed into the second chamber 146 of the insert 92, then into the first chamber 144 of the insert 92, and then into the bore 110 of the bubbler 90. In this regard, the retaining ring 42 may be sized and configured to avoid inhibiting the passage of fluid from the air inlet passageway 44 into the second chamber 146 of the insert 92.

In addition, the first fluid inlet passageway 76 of the end support 12 aligns with the first groove 154 of the insert 92 at or near the first end 160 and is in fluid communication therewith, and the first fluid outlet passageway 78 of the end support 12 aligns with the second groove 156 of the insert 92 at or near the second end 162 and is in fluid communication therewith. Moreover, the first groove 154 of the insert 92 aligns with the first slot 50 in the annular partition 48 of the end support 12 at or near the first end 134 of the insert 92 and is in fluid communication therewith, and the second groove 156 of the insert 92 aligns with the second slot 52 in the annular partition 48 of the end support 12 at or near the first end 134 of the insert 92 and is in fluid communication therewith. As described above, the outer surface 138 of the insert 92 operatively engages with the inner surface 36 of the end support 12 to provide a fluid tight seal therebetween to prevent fluid within the first and second grooves 154, 156 from escaping from the respective grooves 154, 156 into the interfaces between the outer surface 138 and the inner surface 36. For example, an interference fit may be provided between the outer surface 138 and inner surface 36. Likewise, the outer surface 106 of the bubbler 90 operatively engages with the annular partition 48 of the end support 12 to provide a fluid tight seal therebetween to prevent fluid within the groove 112 of the bubbler from escaping from the groove 112 into the interfaces between the outer surface 106 of the bubbler 90 and the annular partition 48. For example, an interference fit may be provided between the outer surface 106 of the bubbler 90 and the annular partition 48.

As described above, the outer surface 106 of the bubbler 90 may also form a fluid tight seal with a portion of the core rod head 16.

Head

Figure 4:
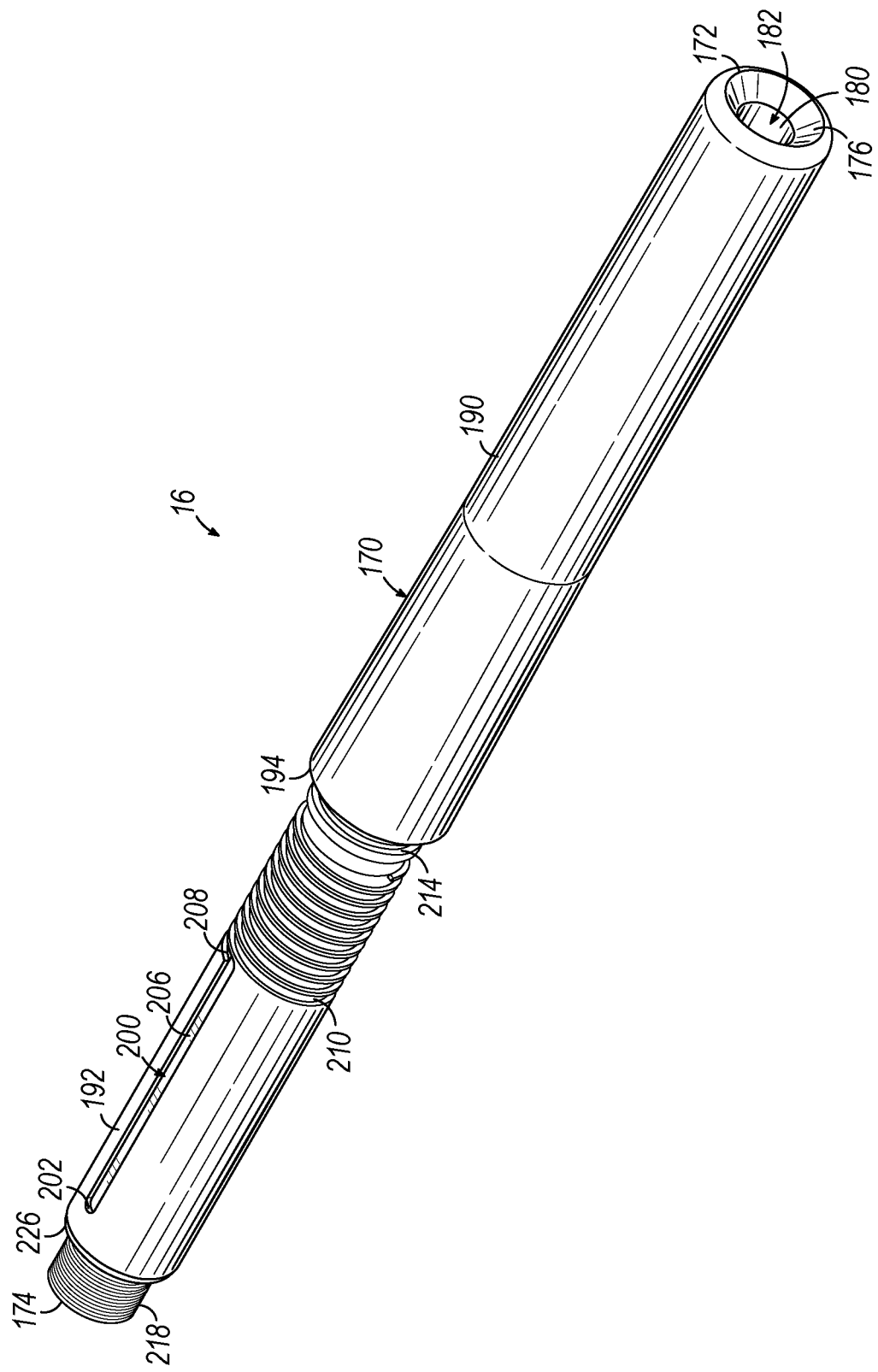
FIG. 4 is a perspective view of the core rod head of FIGS. 1 and 2.

Referring now to FIG. 4, with continuing reference to FIGS. 1, 2, 5, and 5A-5C, the illustrated core rod head 16 includes a generally cylindrical wall 170 extending between first and second ends 172, 174. A valve seat 176 is provided at or near the first end 172 for operatively engaging with a portion of the core rod valve stem assembly 20 to selectively close an air outlet passageway 178 (FIG. 6), as described in greater detail below.

As shown, the wall 170 includes a generally cylindrical inner surface 180 defining a generally cylindrical cavity 182 configured to receive the portion of the bubbler 90 extending outwardly from the annular partition 48 of the end support 12. In this regard, the second end 174 of the head 16 is configured to operatively engage with the O-ring 56 at or near the annular partition 48 to provide a fluid tight seal therebetween (such as when the head 16 is coupled to the end support 12 via the body 18, as described below), and the inner surface 180 of the head 16 is configured to operatively engage with the outer surface 106 of the bubbler 90 to provide a fluid tight seal therebetween to prevent fluid within the groove 112 of the bubbler 90 from escaping from the groove 112 into the interfaces between the outer surface 106 and inner surface 180. For example, the outer surface 106 and inner surface 180 may be sized and shaped relative to each other to provide an interference fit therebetween.

In this manner, and as best shown in FIGS. 5A-5C, a continuous first fluid path indicated by the arrows A1 may be defined by the first fluid inlet passageway 76 (of the end support 12), first groove 154 (of the insert 92), first slot 50 (of the annular partition 48), first longitudinal leg 120 of the groove 112 of the bubbler 90, first helical leg 122 of the groove 112 of the bubbler 90, second helical leg 124 of the groove 112 of the bubbler 90, second longitudinal leg 126 of the groove 112 of the bubbler 90, second slot 52 (of the annular partition 48), second groove 156 (of the insert 92), and first fluid outlet passageway 78 (of the end support 12). Thus, fluid may be provided to the first fluid inlet passageway 76 from a first fluid supply 184 via one or more supply lines (not shown), travel along the first fluid path indicated by the arrows A1, and may then be directed by the first fluid outlet passageway 78 to a first fluid return 186 via one or more return lines (not shown), to thereby define the first fluid distribution system 26.

More particularly, fluid may be directed from the first fluid supply 184 into the first fluid inlet passageway 76 in a radial manner, and subsequently into the first groove 154 along which the fluid may travel in a longitudinal manner into the first slot 50. The fluid may be radially inwardly directed from the first slot 50 into the first longitudinal leg 120 along which the fluid may travel in a longitudinal manner toward the first end 102 of the bubbler 90. From the first longitudinal leg 120 the fluid may enter into the first helical leg 122 along which the fluid may travel in a helical manner toward the first end 102 of the bubbler 90, and subsequently into the second helical leg 124 along which the fluid may travel in a helical manner toward the second end 104 of the bubbler 90. From the second helical leg 124 the fluid may enter into the second longitudinal leg 126 along which the fluid may travel in a longitudinal manner toward the second end 104 of the bubbler 90. The fluid may be radially outwardly directed from the second longitudinal leg 126 into the second slot 52 and may travel in a longitudinal manner into the second groove 156 along which the fluid may travel in a longitudinal manner toward the second end 162. The fluid may then be directed from the second groove 156 into the first fluid outlet passageway 78 in a radial manner, from which the fluid may be directed to the first fluid return 186.

In one embodiment, the first fluid distribution system 26 may include a complete fluid circuit. For example, the first fluid return 186 may be in fluid communication with the first fluid supply 184 such that the first fluid return 186 may direct the returned fluid to the first fluid supply 184 in order to recirculate the fluid through the first fluid path indicated by the arrows A1. The first fluid supply 184 may include a temperature control device, such as a heater or cooler (not shown), for controlling the temperature of the fluid in the first fluid distribution system 26.

The first and second helical legs 122, 124 of the groove 112 of the bubbler 90 may circumferentially distribute the fluid contained therein in a generally even manner such that the fluid contained in the first and second helical legs 122, 124 is in thermal communication with, and may evenly heat (or cool) the portion of the wall 170 of the core head 16 extending thereover, such as the first outer surface 190. In one embodiment, the first outer surface 190 of the wall 170 of the core head 16 may, in turn, heat (or cool) at least a portion of an object extending thereover, such as the preform 22. Thus, the first and second helical legs 122, 124 may together at least partially define a first temperature zone or "zone 1."

The wall 170 of the illustrated core head 16 also includes a generally cylindrical first outer surface 190 proximate the first end 172 and a generally cylindrical second outer surface 192 proximate the second end 174. In the embodiment shown, the second outer surface 192 is positioned radially inwardly relative to the first outer surface 190 to define a first shoulder 194.

As shown, a groove 200 is provided on the second outer surface 192 of the head 16 for receiving a fluid, such as a temperature-controlled fluid, and extends between first and second oppositely disposed ends 202, 204 each proximate the second end 174 of the wall 170. The groove 200 includes a first longitudinally extending leg 206 proximate the second end 174 of the wall 170, first and second helical legs 208, 210 proximate the first shoulder 194 of the wall 170, and a second longitudinally extending leg 212 proximate the second end 174 of the wall 170, the purposes of which are described in greater detail below. In the embodiment shown, the first and second longitudinally extending legs 206, 212 are positioned opposite each other on the second outer surface 192. As shown, the wall 170 further includes an annular notch 214 in the second outer surface 192 at or near the first shoulder 194 for receiving an O-ring 216, for example.

By way of example, and without limitation, each of the first and second helical legs 208, 210 of groove 200 may have a pitch of 0.125, a lead of 0.250, a depth of 0.040 in., a width of 0.093 in., and a flow channel cross-sectional area defined by each of the first and second helical legs 208, 210 of 0.0037 int. Those of ordinary skill in the art will understand that any one or all of these dimensional characteristics for each of the first and second helical legs 208, 210 may be changed for a particular application as desired.

The wall 170 of the head 16 also includes a threaded outer surface 218 at or near the second end 174 for threadably engaging with a locknut 220, such as with a corresponding threaded bore 222 thereof, to assist in fixedly coupling the head 16 to the body 18, for example, such as by sandwiching the body 18 between the locknut 220 and the first shoulder 194 of the head 16. The illustrated locknut 220 is a bearing locknut having an O-ring 224 provided therein. In the embodiment shown, the threaded outer surface 218 is positioned radially inwardly relative to the second outer surface 192 to define a second shoulder 226 which may provide clearance for the locknut 220 to operatively engage a portion of the body 18, for example.

Figure 4A:
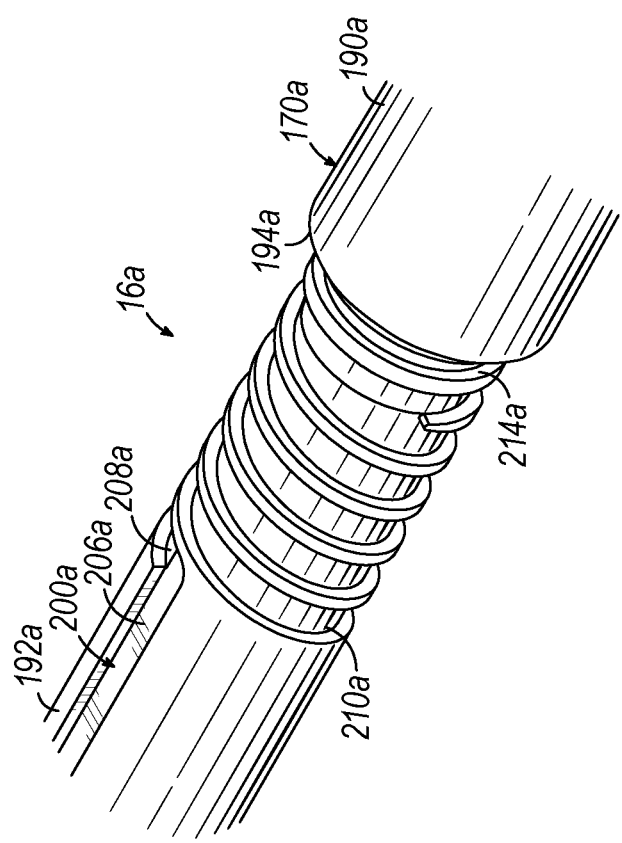
FIG. 4A is a magnified view of an alternative core rod head wherein the groove is enlarged relative to the embodiment shown in FIG. 4.

Referring now to FIG. 4A, an alternative core rod head 16a is shown including a generally cylindrical wall 170a having a generally cylindrical first outer surface 190a and a generally cylindrical second outer surface 192a positioned radially inwardly relative to the first outer surface 190a to define a first shoulder 194a. As shown, a groove 200a is provided on the second outer surface 192a of the head 16a for receiving a fluid, such as a temperature-controlled fluid, and includes a first longitudinally extending leg 206a, first and second helical legs 208a, 210a proximate the first shoulder 194a of the wall 170a, and a second longitudinally extending leg (not shown). In the embodiment shown, the wall 170a further includes an annular notch 214a in the second outer surface 192a at or near the first shoulder 194a for receiving an O-ring 216, for example.

As shown, the pitch, lead, depth, and width of the first and second helical legs 208a, 210a of the groove 200a are increased relative to the embodiment shown in FIG. 4, and the width and depth of the first and second longitudinally-extending legs 206a of the groove 200a are also increased relative to the embodiment shown in FIG. 4, such that the cross sectional area of the groove 200a is increased or enlarged relative to that of the groove 200 shown in FIG. 4. As a result, the alternative core rod head 16a may provide increased flow of fluid, i.e., an increased flow rate, through the groove 200a as compared to the groove 200 of core rod 16 shown in FIG. 4 as will be described in greater detail below.

By way of example, and without limitation, each of the first and second helical legs 208a, 210a of groove 200a may have a pitch of 0.250, a lead of 0.500, a depth of 0.060 in., a width of 0.187 in., and a flow channel cross-sectional area defined by each of the first and second helical legs 208a, 210a of 0.0112 in$^2$. Those of ordinary skill in the art will understand that any one or all of these dimensional characteristics for each of the first and second helical legs 208a, 210a may be changed for a particular application as desired.

Body

Referring now mainly to FIGS. 5-5B, the illustrated core rod body 18 includes a generally cylindrical wall 230 extending between first and second ends 232, 234 and including a generally cylindrical inner surface 236 defining a generally cylindrical cavity 238 configured to receive at least a portion of the core rod head 16, such as the second outer surface 192 thereof. A recess 240 is positioned in the second end 234 of the body 18 for receiving at least a portion of the core rod end support 12, such as the first end 32 thereof. The wall 230 of the body 18 also includes a generally cylindrical first outer surface 242 proximate the first end 232, a generally cylindrical second outer surface 244 between the first and second ends 232, 234, and a generally cylindrical third outer surface 246 proximate the second end 234. As shown, the first outer surface 242 extends from the first end 232 to a radially outwardly projecting or annular surface 248 of the wall 230.

In the embodiment shown, the second outer surface 244 is positioned radially outwardly relative to the first outer surface 242, and the third outer surface 246 is positioned radially outwardly relative to the second outer surface 244. An annular notch 250 is provided in the second outer surface 244 and may be used for locking or alignment purposes, for example, such as when positioning the core rod assembly 10 relative to another molding component.

As shown, a second fluid inlet passageway 252 and a second fluid outlet passageway 254 extend radially through the wall 230 of the body 18 on opposite sides thereof between the third outer surface 246 and the inner surface 236, and are configured to align with the first and second longitudinally extending legs 206, 212 of the groove 200 of the core rod head 16 at or near the first and second ends 202, 204 of the groove 200, respectively. The third outer surface 246 includes first and second flats 256, 258 at or near the second fluid inlet and outlet passageways 252, 254, respectively. A notch 260 is provided in the inner surface 236 of the wall 230 at or near the recess 240 for receiving an O-ring 262, for example.

As described above, the core rod body 18 may be fixedly coupled to the core rod end support 12, such as via the one or more fasteners 70 which may extend through the bores 68 of the mounting flange 66 into corresponding threaded bores (not shown) provided in the second end 234 of the body 18. The O-ring 74 may provide a fluid tight seal between the first end 32 of the end support 12 and the recess 240 of the body 18. Likewise, the core rod body 18 may be fixedly coupled to the core rod head 16, such as via the locknut 220. For example, the locknut 220 may be tightened over the threaded outer surface 218 of the head 16 against the recess 240 in the second end 234 of the body 18 (e.g. prior to coupling the end support 12 to the body 18) such that the first end 232 of the body 18 operatively engages with the first shoulder 194 of the head 16 in order to sandwich the body 18 between the locknut 220 and the first shoulder 194 to thereby secure the head 16 to the body 18. The O-rings 216, 262 may each provide a fluid tight seal between the inner surface 236 of the body 18 and the second outer surface 192 of the head 16. In this manner, the end support 12, head 16, and body 18, may be fixedly coupled to each other in the illustrated arrangement.

With the body 18 coupled to the head 16 as shown, the second fluid inlet passageway 252 of the body 18 aligns with the first longitudinal leg 206 of the groove 200 of the head 16 at or near the first end 202 of the groove 200 and is in fluid communication therewith, and the second fluid outlet passageway 254 of the body 18 aligns with the second longitudinal leg 212 of the groove 200 at or near the second end 204 of the groove 200 and is in fluid communication therewith. The second outer surface 192 of the wall 170 of the head 16 operatively engages with the inner surface 236 of the body 18 to provide a fluid tight seal therebetween to prevent fluid within the groove 200 of the head 16 from escaping from the groove 200 into the interfaces between the second outer surface 192 and the inner surface 236. For example, the second outer surface 192 and inner surface 236 may be sized and shaped relative to each other to provide an interference fit therebetween.

In this manner, and as best shown in FIGS. 5A and 5B, a continuous second fluid path indicated by the arrows A2 may be defined by the second fluid inlet passageway 252 (of the body 18), first longitudinal leg 206 of the groove 200 of the head 16, first helical leg 208 of the groove 200 of the head 16, second helical leg 210 of the groove 200 of the head 16, second longitudinal leg 212 of the groove 200 of the head 16, and second fluid outlet passageway 254 (of the body 18). Thus, fluid may be provided to the second fluid inlet passageway 252 from a second fluid supply 264 via one or more supply lines (not shown), travel along the second fluid path indicated by the arrows A2, and may then be directed by the second fluid outlet passageway 254 to a second fluid return 266 via one or more return lines (not shown), to thereby define the second fluid distribution system 28, which may be fluidly isolated from the first fluid distribution system 26.

More particularly, fluid may be directed from the second fluid supply 264 into the second fluid inlet passageway 252 in a radial manner, and subsequently into the first longitudinal leg 206 along which the fluid may travel in a longitudinal manner toward the first shoulder 194 of the head 16. From the first longitudinal leg 206 the fluid may enter into the first helical leg 208 along which the fluid may travel in a helical manner toward the first shoulder 194 of the head 16, and subsequently into the second helical leg 210 along which the fluid may travel in a helical manner toward the second end 174 of the head 16. From the second helical leg 210 the fluid may enter into the second longitudinal leg 212 along which the fluid may travel in a longitudinal manner toward the second end 174 of the head 16. The fluid may then be directed from the second longitudinal leg 212 into the second fluid outlet passageway 254 in a radial manner, from which the fluid may be directed to the second fluid return 266.

In one embodiment, the second fluid distribution system 28 may include a complete fluid circuit. For example, the second fluid return 266 may be in fluid communication with the second fluid supply 264 such that the second fluid return 266 may direct the returned fluid to the second fluid supply 264 in order to recirculate the fluid through the second fluid path indicated by the arrows A2. The second fluid supply 264 may include a temperature control device, such as a heater or cooler (not shown), for controlling the temperature of the fluid in the second fluid distribution system 28.

The first and second helical legs 208, 210 of the groove 200 of the head 16 may circumferentially distribute the fluid contained therein in a generally even manner such that the fluid contained in the first and second helical legs 208, 210 is in thermal communication with, and may evenly cool (or heat) the portion of the wall 230 of the core body 18 extending thereover, such as the first outer surface 242. In one embodiment, the first outer surface 242 of the wall 230 of the core body 18 may, in turn, heat (or cool) at least a portion of an object extending thereover, such as the preform 22. Thus, the first and second helical legs 208, 210 may together at least partially define a second temperature zone or "zone 2."

In the embodiment shown, the first and second fluid paths indicated by the arrows A1 and A2 overlap with each other along at least a portion of their respective lengths. For example, the longitudinal legs 120, 126 of the groove 112 of the bubbler 90 overlap with and are radially inward of the longitudinal legs 206, 212 and helical legs 208, 210 of the groove 200 of the head 16. However, the illustrated first and second temperature zones do not overlap with each other. In this regard, the helical legs 122, 124 of the groove 112 of the bubbler 90 are axially displaced relative to, i.e., longitudinally offset from, the helical legs 208, 210 of the groove 200 of the head 16. More particularly, the helical legs 122, 124 of the groove 112 of the bubbler 90 are positioned on a first side of the first shoulder 194 of the head 16 and the helical legs 208, 210 of the groove 200 of the head 16 are positioned on a second side of the first shoulder 194, such that the first shoulder 194 may generally delineate the first temperature zone from the second temperature zone such that the first temperature zone is axially displaced, i.e., longitudinally offset from, the second temperature zone. In the embodiment shown, the first temperature zone is located distally of the second temperature zone. As a result, the first outer surface 190 of the head 16 may be generally within the first temperature zone and the first outer surface 242 of the body 18 may be generally within the second temperature zone.

Valve Stem Subassembly

Referring now primarily to FIGS. 5A-5C, the illustrated valve stem subassembly 20 includes a generally cylindrical valve stem 270, a valve 272, a cam nut 274, a star nut 276, and a biasing member in the form of a compression spring 278. The valve stem 270 extends between first and second ends 280, 282 and includes first and second threaded surfaces 284, 286 at or near the first and second ends 280, 282, respectively. As shown, the first threaded surface 284 is configured to threadably engage with a corresponding threaded bore 288 of the valve 272 to secure the valve 272 at or near the first end 280. An additional soldering step may be provided to secure the valve 272 to the first end 280 of the valve stem 270. The second threaded surface 286 is configured to threadably engage with corresponding threaded bores 290, 292 of the star nut 276 and/or cam nut 274 to secure the star nut 276 and/or cam nut 274 at or near the second end 282. As shown, the star nut 276 includes a plurality of radially extending and spaced apart prongs 294 configured to operatively engage with a portion of the bubbler subassembly 14, as described in greater detail below. In the embodiment shown, the spring 278 is a coil spring including a plurality of turns 296 and is positioned adjacent the star nut 276 opposite the cam nut 274.

The valve stem 270 may be received within the bubbler subassembly 14 and spaced apart from the inner surfaces 108, 140, 142 thereof to allow fluid, such as air, to pass between the valve stem 270 and the inner surfaces 108, 140, 142. More particularly, the valve stem 270 may be received within the bore 110 of the bubbler 90 and within the first and second chambers 144, 146 of the insert 92 such that the valve 272 may be capable of operatively engaging the valve seat 176 of the head 16, and such that the star nut 276 may be positioned within the second chamber 146 of the insert 92 with the spring 278 extending between the star nut 276 and the exposed portion of the second end 104 of the bubbler 90. In this manner, interaction between the star nut 276, the spring 278, and the second end 104 of the bubbler 90 may urge the valve 272 into operative engagement with the valve seat 176 to maintain the valve 272 in a closed position during normal conditions (FIG. 5). Similarly, interaction between the spaced apart prongs 294 of the star nut 276 and the shoulder 148 of the insert 92 may prevent the valve 272 from becoming inadvertently dislodged, such as when the bore 110 and first and second chambers 144, 146 are pressurized via an air source 300 for blow molding (FIG. 6). In this regard, the cam nut 274, star nut 276, and spring 278 may each be configured to avoid inhibiting the passage of air into the bore 110 from the air source via the first and second chambers 144, 146.

Process

With specific reference to FIG. 5, during an injection blow molding (IBM) process, the core rod assembly 10 is at least partially inserted into a first mold, referred to herein as an injection mold 302, having a first mold cavity 304. A molten material is injected into the space between the core rod assembly 10 and the first mold cavity 304 to form the preform 22. The first outer surface 190 of the head 16, the first outer surface 242 of the body 18, and the annular surface 248 of the body 18 may together form the internal shape of the preform 22. In this regard, the first outer surfaces 190, 242 of the head 16 and the body 18 may be aligned with each other to provide a generally smooth transition therebetween. In addition or alternatively, the first outer surface(s) 190, 242 of the head 16 and/or body 18 may be at least partially tapered and/or curved to vary the thickness of the preform 22, for example.

In the embodiment shown, the preform 22 includes a neck portion 306 and a body portion 308. The neck portion 306 is generally formed over the first outer surface 242 of the core rod body 18 in the second temperature zone and the body portion 308 is generally formed over the first outer surface 190 of the core rod head 16 in the first temperature zone. The preform 22 may also include a shrink ring 310 which may be formed by the first mold cavity 304 of the injection mold 302 and which may approximately delineate the neck portion 306 from the body portion 308.

With specific reference to FIG. 6, after the preform 22 has been formed on the core rod assembly 10, the core rod assembly 10 may be removed from the injection mold 302 and at least partially inserted into a second mold, referred to herein as a blow mold 312, having a second mold cavity 314. The body portion 308 of the preform 22 may be inflated into contact with the second mold cavity 314 of the blow mold 312 to form the finished article 24.

To inflate the body portion 308 of the preform 22, compressed air may be supplied to the second chamber 146 of the insert 92 from the air source 300 via the air inlet passageway 44 in the second end 34 of the end support 12. The air may travel around the cam nut 274, between the prongs 294 of the star nut 276, between the turns 296 of the spring 278, and between the valve stem 270 and the inner surface 108 of the bubbler 90 to the valve 272. In one embodiment, the compressed air may be channeled through a piston system (not shown) that applies a mechanical force to the valve stem 270 (e.g., via the cam nut 274) sufficient to overcome the biasing of the spring 278 to thereby at least partially longitudinally displace the valve 272 from the valve seat 176 and thus open the air outlet passageway 178 in an "open" position of the valve 272. Upon removal of the applied force (e.g., by shutting off the compressed air), the biasing of the spring 278 may urge the valve 272 into operative engagement with the valve seat 176, thereby closing the air outlet passageway 178 in a "closed" position of the valve 272. It will be appreciated that other suitable actuation techniques may be used to move the valve 272 between the open and closed positions.

In any event, with the valve 272 in the open position, the compressed air may flow freely through the bore 110 of the bubbler 90 and exit the bore 110 via the air outlet passageway 178 provided between the valve 272 and valve seat 176. The compressed air may then enter the interior of the body portion 308 of the preform 22 to thereby internally pressurize and inflate the body portion 308 into contact with the second mold cavity 314 of the blow mold 312, as indicated by the arrows A3. The piston or other actuator may remain activated to hold the valve 272 in the open position throughout the blow cycle and a subsequent exhaust cycle, for example. When the exhaust cycle is complete, the compressed air may be shut off, thereby allowing the biasing of the spring 278 to push the piston back mechanically so that the valve 272 may be re-seated against the valve seat 176 in the closed position.

During the IBM process, the first temperature-controlled fluid distribution system 26 may distribute a first temperature-controlled fluid to the first temperature zone. For example, the first temperature-controlled fluid may heat the portion of the wall 170 of the head 16 within the first temperature zone, such as the first outer surface 190 thereof. The wall 170 of the head 16 may, in turn, heat at least a portion of the preform 22, such as the body portion 308. Thus, the body portion 308 of the preform 22 may be maintained at or near a first temperature. The first temperature may be selected to be above the glass transition temperature of the preform 22. For example, for PETG having a glass transition temperature of about 78° C. to about 80° C., the temperature of the first fluid may be between about 170° F. (77° C.) and about 300° F. (149° C.). Other temperatures may be used depending on the materials used, for example. The first fluid may be any suitable noncorrosive fluid such as oil, water, or glycol, for example.

Likewise, the second temperature-controlled fluid distribution system 28 may distribute a second temperature-controlled fluid to the second temperature zone. For example, the second temperature-controlled fluid may cool the portion of the wall 230 of the body 18 within the second temperature zone, such as the first outer surface 242 thereof. The wall 230 of the body 18 may, in turn, cool at least a portion of the preform 22, such as the neck portion 306. Thus, the neck portion 306 of the preform 22 may be maintained at or near a second temperature different from the first temperature. For example, the second temperature may be lower than the first temperature. In this regard, the second temperature may be selected to cool the neck portion 306 of the preform 22 relative to the body portion 308. For example, for PETG having a glass transition temperature of about 78° C. to about 80° C., the temperature of the second fluid may be between about 100° F. (38° C.) and about 170° F. (75° C.). Other temperatures may be used depending on the materials used, for example. The second fluid may be any suitable noncorrosive fluid such as oil, water, or glycol, for example.

In this manner, the first and second temperature-controlled fluid distribution systems 26, 28 of the core rod assembly 10 may allow the temperatures of the neck and body portions 306, 308 of the preform 22 to be selectively controlled independent of each other. This may allow the neck portion 306 to be maintained at a lower temperature than that of the body portion 308, for example, which may reduce or eliminate the tendencies of the neck portion 306 to stick to the core rod assembly 10 and/or to leave residue on the core rod assembly 10 during ejection of the finished article 24 from the core rod assembly 10. Consequently, routine wipe-downs of the core rod assembly 10 or defects in the neck of the bottle or other container 24 may be reduced or eliminated.

Figure 7:
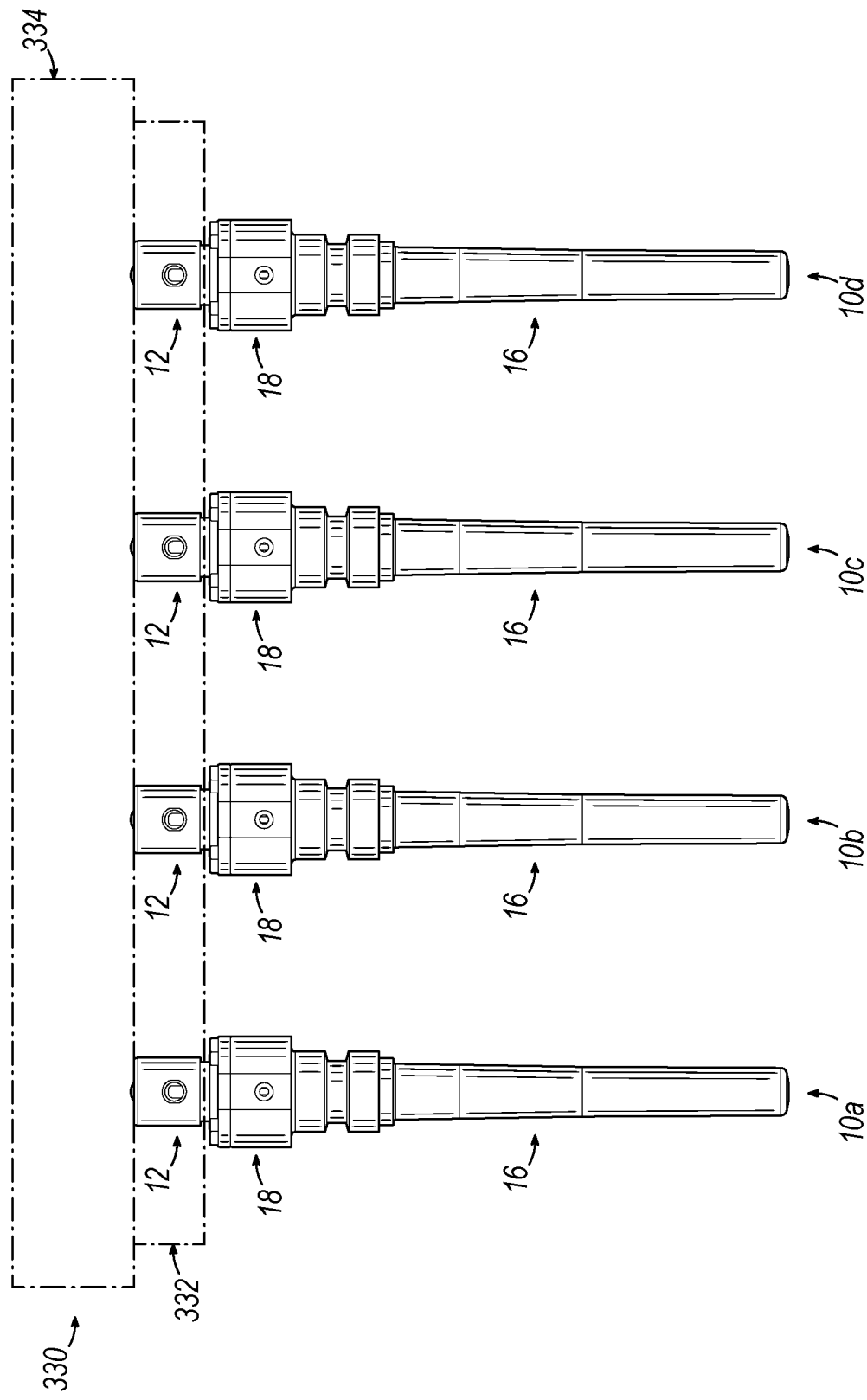
FIG. 7 is a schematic view of an articulating arm (manifold) carrying a plurality of core rod assemblies in accordance with an embodiment of the invention.

Referring now to FIG. 7, a plurality of core rod assemblies 10a, 10b, 10c, 10d of substantially uniform configuration may be mounted together in an articulating arm 330. The arm includes a first or lower manifold 332 including recesses (not shown) for receiving the core rod assemblies 10a, 10b, 10c, 10d, such as the end supports 12 thereof. In one embodiment, the end supports 12 may each be mounted to the lower manifold 332 via the annular notch 64. The arm 330 also includes a second or upper manifold 334 configured to house various auxiliary components for the core rod assemblies 10, such as fluid supply and/or return lines (not shown), for example. In one embodiment, the articulating arm 330 may be configured to selectively transfer the core rod assemblies 10a, 10b, 10c, 10d between the injection mold 302 and the blow mold 312, and/or to other stations for performing the IBM process, such as an ejection station (not shown), for example.

Figure 8:
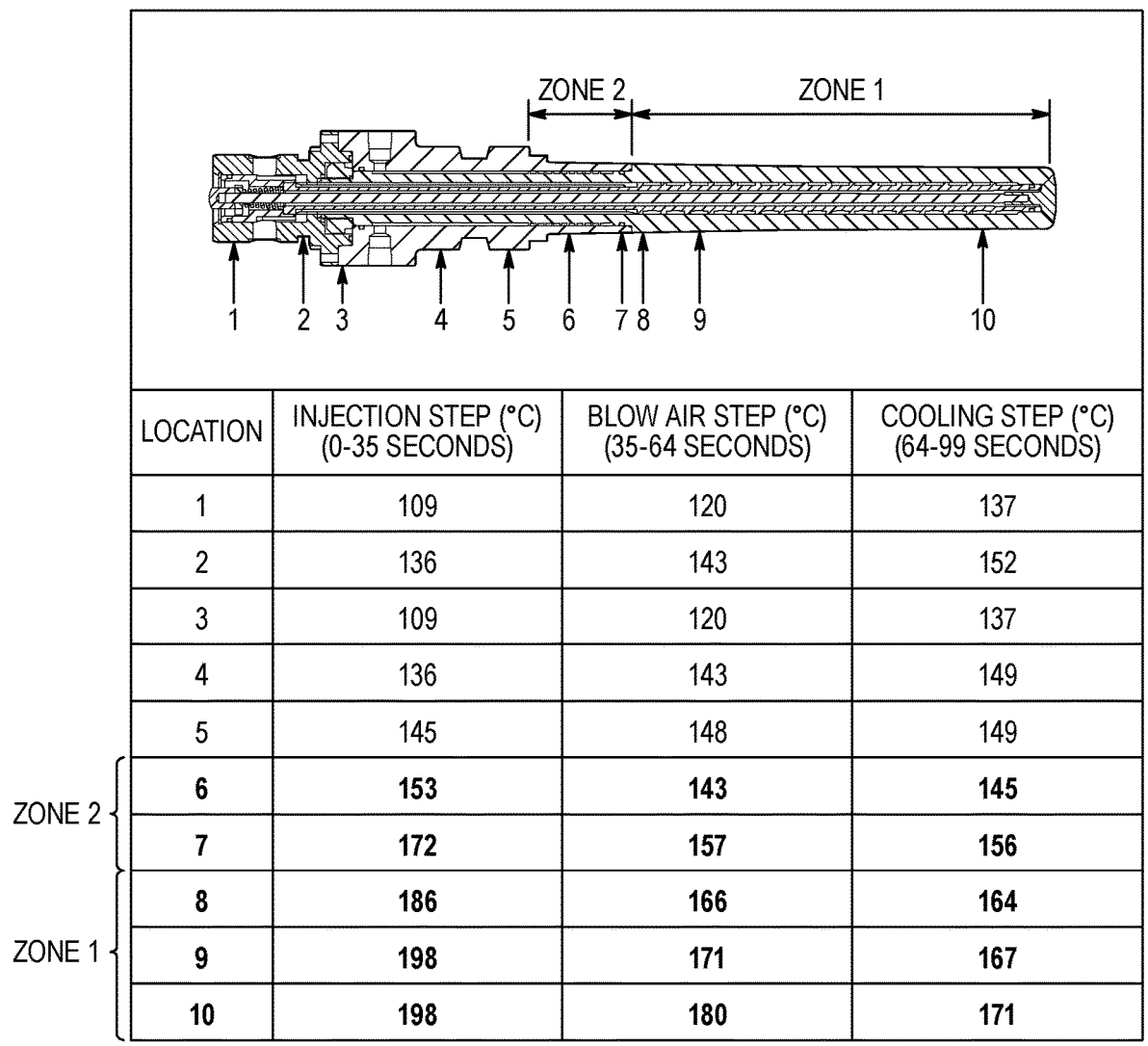
FIG. 8 is a diagram illustrating various exemplary temperature profiles of the exemplary core rod assembly.

FIG. 8 illustrates exemplary temperature profiles of the core rod assembly 10 at various locations therealong resulting from an exemplary use of the first and second temperature-controlled fluid distribution systems 26, 28 during the injection, blowing, and cooling steps of an IBM process using PETG as the working material. As shown, locations 6 and 7 in FIG. 8 generally correspond to the second temperature zone or "zone 2," and locations 8, 9, and 10 generally correspond to the first temperature zone or "zone 1." To achieve the indicated temperatures, the temperature of the fluid in the first distribution system 26 may be about 170° F. (77° C.) and the temperature of the fluid in the second distribution system 28 may be about 140° F. (60° C.).

Table 1 provides exemplary temperature approximations and/or ranges for the temperatures of the fluids in zone 1 and zone 2, and exemplary fluid flow rates in each of zone 1 and zone 2, when using various working materials as listed.

TABLE 1

Exemplary Temperature Ranges and Fluid Flow Rates for Zone 1 and Zone 2 Fluids

| Material | Glass Transition Temperature (° C.) | Zone 1 Temperature (° C.) | Zone 2 Temperature (° C.) | Zone 1 Body Flow Rate (GPM) | Zone 2 Neck Flow Rate (GPM) |
| --- | --- | --- | --- | --- | --- |
| PET - Polyethylene terephthalate | 70 | 77-149 | 38-60 | 0.3 | 0.4 |
| PETG - Polyethylene terephthalate glycol modified | 79-81 | 77-149 | 38-75 | 0.3-0.75 | 0.4-0.75 |
| Tritan ™ - polyethylene terephthalate copolyester | 108 | 77-149 | 38-60 | 0.3 | 0.4 |
| HDPE - High density polyethylene | (−25) | 120-149 | 38-15 | 0.3 | 0.4 |
| LDPE - Low density polyethylene | (−25) | 89-109 | 38-80 | 0.3 | 0.4 |
| PP - Polypropylene | (−20)-(−5) | 130-149 | 38-125 | 0.3 | 0.4 |
| PS - Polystyrene | 74-100 | 89-109 | 38-80 | 0.3 | 0.4 |
| PC - Polycarbonate | 145-148 | 149 | 68 | 0.3 | 0.4 |
| PSF - Polysulfone | 185-195 | 160 | 80 | 0.3 | 0.4 |

The various temperature approximations and/or ranges and fluid flow rates for each of zone 1 and zone 2 provided herein, including those provided in Table 1, are illustrative and are not intended to be limiting. In this regard, it will be appreciated that different grades of the same resin or other materials may exhibit different behaviors. For example, the PC and PSF values provided in Table 1 may be indicative of particular grades of PC and PSF, respectively. Thus, deviations from the temperature approximations and/or ranges provided herein may be possible. Also, it will be understood that for achieving the higher fluid flow rate ranges listed above, the dimensional characteristics of the alternative core rod head 16a may be more desired over those of core rod head 16.

For certain materials such as those listed in Table 1 having glass transition temperature values below room temperature (e.g., HDPE, LDPE, PP), the first and second temperature controlled fluid distribution systems 26, 28 of the core rod assembly 10 may allow preferential cooling of the relatively thick neck portion 306 in order to reduce cycle time and improve quality of the neck portion 306, since the finished article 24 cannot be ejected until the finished article 24 is sufficiently cool such that the neck portion 306 will retain proper dimensions.

While the exemplary core rod assembly 10 has been described as being used in an IBM process, it will be appreciated that the core rod assembly 10 may be used in any other suitable application. For example, the core rod assembly 10 may be used in an injection stretch blow molding (ISBM) process. It will also be appreciated that in a particular application, the respective temperatures of "zone 1" and "zone 2" may be the same, or at least generally the same.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A core rod assembly for blow molding, comprising:
   a core rod head extending longitudinally between first and second ends;
   a first fluid pathway located within the core rod assembly and extending along a first length of the core rod head;
   a second fluid pathway located within the core rod assembly and extending along a second length of the core rod head, wherein the first and second fluid pathways are fluidly isolated from each other, and further wherein a portion of the first fluid pathway is longitudinally offset from the second fluid pathway; and
   a third fluid pathway located within the core rod assembly and extending along a third length of the core rod head, wherein the third fluid pathway is fluidly isolated from the first and second fluid pathways.

2. The core rod assembly of claim 1, wherein the core rod head includes an inner surface, and wherein the first fluid pathway is positioned along, and in thermal communication with, the inner surface.

3. The core rod assembly of claim 1, wherein the core rod head includes an outer surface, and wherein the second fluid pathway is positioned along the outer surface.

4. The core rod assembly of claim 1, further comprising:
   a core rod bubbler positioned at least partially within the core rod head, wherein the first fluid pathway is at least partially defined by the core rod bubbler and the core rod head.

5. The core rod assembly of claim 4, further comprising a valve stem positioned at least partially within the core rod bubbler and a valve supported at one end of the valve stem.

6. The core rod assembly of claim 1, further comprising:
   a core rod body, wherein the core rod head is at least partially received within the core rod body, and further wherein the second fluid pathway is at least partially defined by the core rod body and the core rod head with the second fluid pathway being in thermal communication with a portion of the core rod body.

7. The core rod assembly of claim 1, wherein the first length at least partially overlaps the second length.

8. The core rod assembly of claim 1, wherein the first fluid pathway defines a first zone along a first length of the core rod assembly and the second fluid pathway defines a second zone along a second length of the core rod assembly, wherein the first zone is longitudinally offset from the second zone, and wherein the first fluid pathway is configured to supply a first temperature controlled fluid at a first temperature to the first zone and the second fluid pathway is configured to supply a second temperature controlled fluid at a second temperature to the second zone.

9. The core rod assembly of claim 8, wherein the first fluid pathway includes at least one first helical leg and wherein the first zone is defined by the at least one first helical leg.

10. The core rod assembly of claim 8, wherein the second fluid pathway includes at least one second helical leg and wherein the second zone is defined by the at least second helical leg.

11. The core rod assembly of claim 8, wherein the first zone is located distally of the second zone.

12. A method of blow molding an article, comprising:
    forming a preform over first and second portions of a core rod assembly, the preform including a body portion positioned over the first portion of the core rod assembly and a neck portion positioned over the second portion of the core rod assembly;
    controlling a first temperature of the body portion of the preform via a first temperature-controlled fluid traveling within the core rod assembly and being in thermal communication with the first portion of the core rod assembly; and
    controlling a second temperature of the neck portion of the preform via a second temperature-controlled fluid traveling within the core rod assembly and being in thermal communication with the second portion of the core rod assembly, wherein the second temperature-controlled fluid is fluidly isolated from the first temperature-controlled fluid, and wherein the first temperature is greater than the second temperature.

13. The method of claim 12, wherein the first portion of the core rod assembly is longitudinally offset from the second portion.

14. The method of claim 13, wherein the first portion is located distally of the second portion.

15. The method of claim 12, wherein the first temperature-controlled fluid travels in a helical manner along at least a partial longitudinal length of the core rod assembly.

16. The method of claim 15, wherein the second temperature-controlled fluid travels in a helical manner along at least a partial longitudinal length of the core rod assembly.

17. The method of claim 12, wherein the first temperature is greater than the second temperature.

18. The method of claim 12, wherein the first temperature-controlled fluid comprises a first liquid and the second temperature-controlled fluid comprises a second liquid.

19. A core rod assembly for blow molding, comprising:
    a core rod head extending longitudinally between first and second ends;
    a first fluid pathway located within the core rod assembly and extending along a first length of the core rod head;
    a second fluid pathway located within the core rod assembly and extending along a second length of the core rod head, wherein the first and second fluid pathways are fluidly isolated from each other, and further wherein a portion of the first fluid pathway is longitudinally offset from the second fluid pathway;

a core rod bubbler positioned at least partially within the core rod head, wherein the first fluid pathway is at least partially defined by the core rod bubbler and the core rod head; and a valve stem positioned at least partially within the core rod bubbler and a valve supported at one end of the valve stem.

20. The core rod assembly of claim 19, wherein the core rod head includes an inner surface, and wherein the first fluid pathway is positioned along, and in thermal communication with, the inner surface.

21. The core rod assembly of claim 19, wherein the core rod head includes an outer surface, and wherein the second fluid pathway is positioned along the outer surface.

22. The core rod assembly of claim 19, further comprising:

a core rod body, wherein the core rod head is at least partially received within the core rod body, and further wherein the second fluid pathway is at least partially defined by the core rod body and the core rod head with the second fluid pathway being in thermal communication with a portion of the core rod body.

23. The core rod assembly of claim 19, wherein the first length at least partially overlaps the second length.

24. The core rod assembly of claim 19, wherein the first fluid pathway defines a first zone along a first length of the core rod assembly and the second fluid pathway defines a second zone along a second length of the core rod assembly, wherein the first zone is longitudinally offset from the second zone, and wherein the first fluid pathway is configured to supply a first temperature controlled fluid at a first temperature to the first zone and the second fluid pathway is configured to supply a second temperature controlled fluid at a second temperature to the second zone.

25. The core rod assembly of claim 24, wherein the first fluid pathway includes at least one first helical leg and wherein the first zone is defined by the at least one first helical leg.

26. The core rod assembly of claim 24, wherein the second fluid pathway includes at least one second helical leg and wherein the second zone is defined by the at least second helical leg.

27. The core rod assembly of claim 24, wherein the first zone is located distally of the second zone.

28. A core rod assembly for blow molding, comprising:
a core rod head extending longitudinally between first and second ends;
a first fluid pathway located within the core rod assembly and extending along a first length of the core rod head;
a second fluid pathway located within the core rod assembly and extending along a second length of the core rod head, wherein the first and second fluid pathways are fluidly isolated from each other, and further wherein a portion of the first fluid pathway is longitudinally offset from the second fluid pathway, wherein the first fluid pathway defines a first zone along a first length of the core rod assembly and the second fluid pathway defines a second zone along a second length of the core rod assembly, wherein the first zone is longitudinally offset from the second zone, and wherein the first fluid pathway is configured to supply a first temperature controlled fluid at a first temperature to the first zone and the second fluid pathway is configured to supply a second temperature controlled fluid at a second temperature to the second zone, wherein the first fluid pathway includes at least one first helical leg and wherein the first zone is defined by the at least one first helical leg, and wherein the second fluid pathway includes at least one second helical leg and wherein the second zone is defined by the at least second helical leg.

29. The core rod assembly of claim 28, wherein the core rod head includes an inner surface, and wherein the first fluid pathway is positioned along, and in thermal communication with, the inner surface.

30. The core rod assembly of claim 28, wherein the core rod head includes an outer surface, and wherein the second fluid pathway is positioned along the outer surface.

31. The core rod assembly of claim 28, further comprising:

a core rod bubbler positioned at least partially within the core rod head, wherein the first fluid pathway is at least partially defined by the core rod bubbler and the core rod head.

32. The core rod assembly of claim 31, further comprising a valve stem positioned at least partially within the core rod bubbler and a valve supported at one end of the valve stem.

33. The core rod assembly of claim 28, further comprising:

a core rod body, wherein the core rod head is at least partially received within the core rod body, and further wherein the second fluid pathway is at least partially defined by the core rod body and the core rod head with the second fluid pathway being in thermal communication with a portion of the core rod body.

34. The core rod assembly of claim 28, wherein the first length at least partially overlaps the second length.

35. The core rod assembly of claim 28, wherein the first zone is located distally of the second zone.

* * * * *

UNITED STATES PATENT AND TRADEMARK OFFICE
CERTIFICATE OF CORRECTION

| | |
|---|---|
| PATENT NO. | : 11,420,378 B2 |
| APPLICATION NO. | : 17/296618 |
| DATED | : August 23, 2022 |
| INVENTOR(S) | : David F. Voigt |

It is certified that error appears in the above-identified patent and that said Letters Patent is hereby corrected as shown below:

In the Specification

In Column 3, Lines 50-51, change "which may reduce or eliminate the tenancies of the neck portion" to --which may reduce or eliminate the tendencies of the neck portion--.

In Column 9, Line 58, change "of 0.0037 int." to --of 0.0037 $in^2$.--.

In the Claims

In Claim 26, Column 19, Lines 41-42, change "wherein the second zone is defined by the at least second helical leg." to --wherein the second zone is defined by the at least one second helical leg.--.

In Claim 28, Column 20, Line 21, change "defined by the at least second helical leg." to --defined by the at least one second helical leg.--.

Signed and Sealed this
Fifteenth Day of November, 2022

Katherine Kelly Vidal
*Director of the United States Patent and Trademark Office*